(12) United States Patent
Kamran et al.

(10) Patent No.: US 11,853,568 B2
(45) Date of Patent: Dec. 26, 2023

(54) FRONT-END OFFLOAD OF STORAGE SYSTEM HASH AND COMPRESSION PROCESSING

(71) Applicant: EMC IP Holding Company LLC, Hopkinton, MA (US)

(72) Inventors: Lior Kamran, Rishon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 51 days.

(21) Appl. No.: 17/076,208

(22) Filed: Oct. 21, 2020

(65) Prior Publication Data

US 2022/0121361 A1    Apr. 21, 2022

(51) Int. Cl.
*G06F 3/06* (2006.01)
*G06F 21/60* (2013.01)

(52) U.S. Cl.
CPC .............. *G06F 3/064* (2013.01); *G06F 3/067* (2013.01); *G06F 3/0608* (2013.01);
(Continued)

(58) Field of Classification Search
CPC .... G06F 21/602; G06F 3/0629; G06F 3/0653; G06F 3/0659; G06F 3/0683; G06F 3/067; G06F 3/0608; G06F 3/064
(Continued)

(56) References Cited

U.S. PATENT DOCUMENTS 7,165,155 B1   1/2007 Duprey et al.
7,440,982 B2   10/2008 Lu et al.
(Continued)

FOREIGN PATENT DOCUMENTS

WO    2020204880 A1   10/2010
WO    2016111954 A1   7/2016
(Continued)

OTHER PUBLICATIONS

EMC Corporation, "Introduction to the EMC XtremIO Storage Array (Ver. 4.0): A Detailed Review," White Paper, Apr. 2015, 65 pages.
(Continued)

*Primary Examiner* — Sanjiv Shah
*Assistant Examiner* — Edward Waddy, Jr.
(74) *Attorney, Agent, or Firm* — Ryan, Mason & Lewis, LLP

(57) ABSTRACT

A storage system in one embodiment comprises a front-end device and a first storage node corresponding to the front-end device. The first storage node comprises a processor that is separate from the front-end device. The front-end device is configured to obtain a write operation that comprises at least a first block of data and to calculate a hash digest based at least in part on the first block of data. The front-end device is configured to provide the hash digest to the processor. The processor is configured to identify a first data page that comprises a second block of data that is a target for replacement by the first block of data and to identify a second storage node based at least in part on the first data page. The processor is configured to transmit the hash digest to the second storage node.

12 Claims, 9 Drawing Sheets

(52) U.S. Cl.
CPC .......... *G06F 3/0629* (2013.01); *G06F 3/0653* (2013.01); *G06F 3/0659* (2013.01); *G06F 3/0683* (2013.01); *G06F 21/602* (2013.01)

(58) Field of Classification Search
USPC ................... 711/154, 181; 709/247; 726/26
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |
| 9,235,507 B2* | 1/2016 | Owa .................... G06F 3/0616 |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 9,983,822 B1* | 5/2018 | Karr .................... G06F 3/0611 |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Stronge et al. |
| 10,394,485 B1 | 8/2019 | Chen et al. |
| 10,437,501 B1 | 10/2019 | Kucherov et al. |
| 10,437,855 B1 | 10/2019 | Stronge et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Stronge |
| 10,754,736 B2 | 8/2020 | Shani et al. |
| 10,761,933 B2 | 9/2020 | Moore et al. |
| 10,783,038 B2 | 9/2020 | Moore et al. |
| 2007/0022121 A1 | 1/2007 | Bahar et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0225123 A1 | 9/2011 | D'Souza et al. |
| 2011/0238860 A1* | 9/2011 | Vange .................... H04L 47/24 709/233 |
| 2012/0124282 A1 | 5/2012 | Frank et al. |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0237202 A1* | 8/2014 | Yamamoto ............... G06F 3/061 711/162 |
| 2014/0244935 A1 | 8/2014 | Ezra et al. |
| 2014/0310476 A1* | 10/2014 | Kruus .................. G06F 12/0871 711/133 |
| 2015/0378766 A1 | 12/2015 | Beveridge et al. |
| 2015/0378785 A1 | 12/2015 | Tarasuk-Levin et al. |
| 2016/0004453 A1* | 1/2016 | Ben-Tsion ............ G06F 3/0638 711/162 |
| 2016/0011786 A1* | 1/2016 | Ninose .................. G06F 3/0616 711/103 |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2016/0350391 A1* | 12/2016 | Vijayan ................ G06F 3/0619 |
| 2017/0075842 A1 | 3/2017 | Su et al. |
| 2017/0185529 A1 | 6/2017 | Chhabra et al. |
| 2017/0192857 A1 | 7/2017 | Meiri et al. |
| 2018/0024748 A1* | 1/2018 | Hahn .................... G06F 3/0673 711/154 |
| 2018/0095873 A1 | 4/2018 | Nakagoe et al. |
| 2019/0303490 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0042500 A1* | 2/2020 | Li ........................ H03M 7/3057 |
| 2020/0092086 A1* | 3/2020 | Raman .................. H04L 63/123 |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |
| 2021/0124686 A1* | 4/2021 | Kamran ............... G06F 12/0824 |
| 2021/0134052 A1* | 5/2021 | DeLaurier ............... G09G 5/363 |
| 2021/0173563 A1* | 6/2021 | Yamaga ................. G06F 3/065 |
| 2021/0191658 A1* | 6/2021 | Mizushima ........... G06F 3/0688 |
| 2021/0295181 A1* | 9/2021 | Goyal .................... G06N 20/00 |

FOREIGN PATENT DOCUMENTS

| | | |
|---|---|---|
| WO | PCT/US2019/024885 | 1/2020 |
| WO | PCT/US2019/024900 | 1/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

(56) References Cited

OTHER PUBLICATIONS

Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Dell EMC, "PowerMax OS," Dell EMC PowerMax Family Product Guide, May 2019, 192 pages.
Dell EMC, "Dell EMC VxRack FLEX," Dell EMC Product Overview, 2018, 5 pages.
U.S. Appl. No. 15/662,708 filed in the name of Xiangping Chen et al. Jul. 28, 2017, and entitled "Token-Based Data Flow Control in a Clustered Storage System."
U.S. Appl. No. 15/793,121 filed in the name of David Meiri et al. Oct. 25, 2017, and entitled "Opportunistic Compression of Replicated Data in a Content Addressable Storage System."
U.S. Appl. No. 15/824,536 filed in the name of Christopher Sayles et al. Nov. 28, 2017, and entitled "Storage System with Asynchronous Messaging between Processing Modules for Data Replication."
U.S. Appl. No. 16/343,942 filed in the name of Yonatan Shtarkman et al. Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. Apr. 22, 2019, and entitled "Snapshot-Enabled Storage System Implementing Algorithm for Efficient Reading of Data from Stored Snapshots."
U.S. Appl. No. 16/396,897 filed in the name of Anton Kucherov et al. Apr. 29, 2019, and entitled "Storage System with Deduplication-Aware Replication Implemented Using a Standard Storage Command Protocol."
U.S. Appl. No. 16/413,050 filed in the name of Xiangping Chen et al. May 15, 2019, and entitled "Storage System with Coordinated Recovery across Multiple Input-Output Journals of Different Types."
U.S. Appl. No. 16/530,121 filed in the name of Anton Kucherov et al. Aug. 2, 2019, and entitled "Memory-Efficient Processing of Raid Metadata Bitmaps."
U.S. Appl. No. 16/663,524 filed in the name of Xiangping Chen et al. Oct. 25, 2019, and entitled "Storage System with Throughput-Based Timing of Synchronous Replication Recovery."
U.S. Appl. No. 16/665,651 filed in the name of Lior Kamran et al. Oct. 28, 2019, and entitled "Recovery Flow with Reduced Address Lock Contention in a Content Addressable Storage System."
U.S. Appl. No. 16/671,824 filed in the name of Lior Kamran et al. Nov. 1, 2019, and entitled "Storage System Capacity Expansion Using Mixed-Capacity Storage Devices."
U.S. Appl. No. 16/693,858 filed in the name of Doron Tal Nov. 25, 2019, and entitled "Storage System with Prioritized RAID Rebuild."
U.S. Appl. No. 16/884, 133 filed in the name of Lior Kamran May 27, 2020, and entitled "Front-End Offload of Storage System Processing."
Australian Examination Report for Application No. AU2021382976, dated Sep. 8, 2023, 2 pages.

* cited by examiner

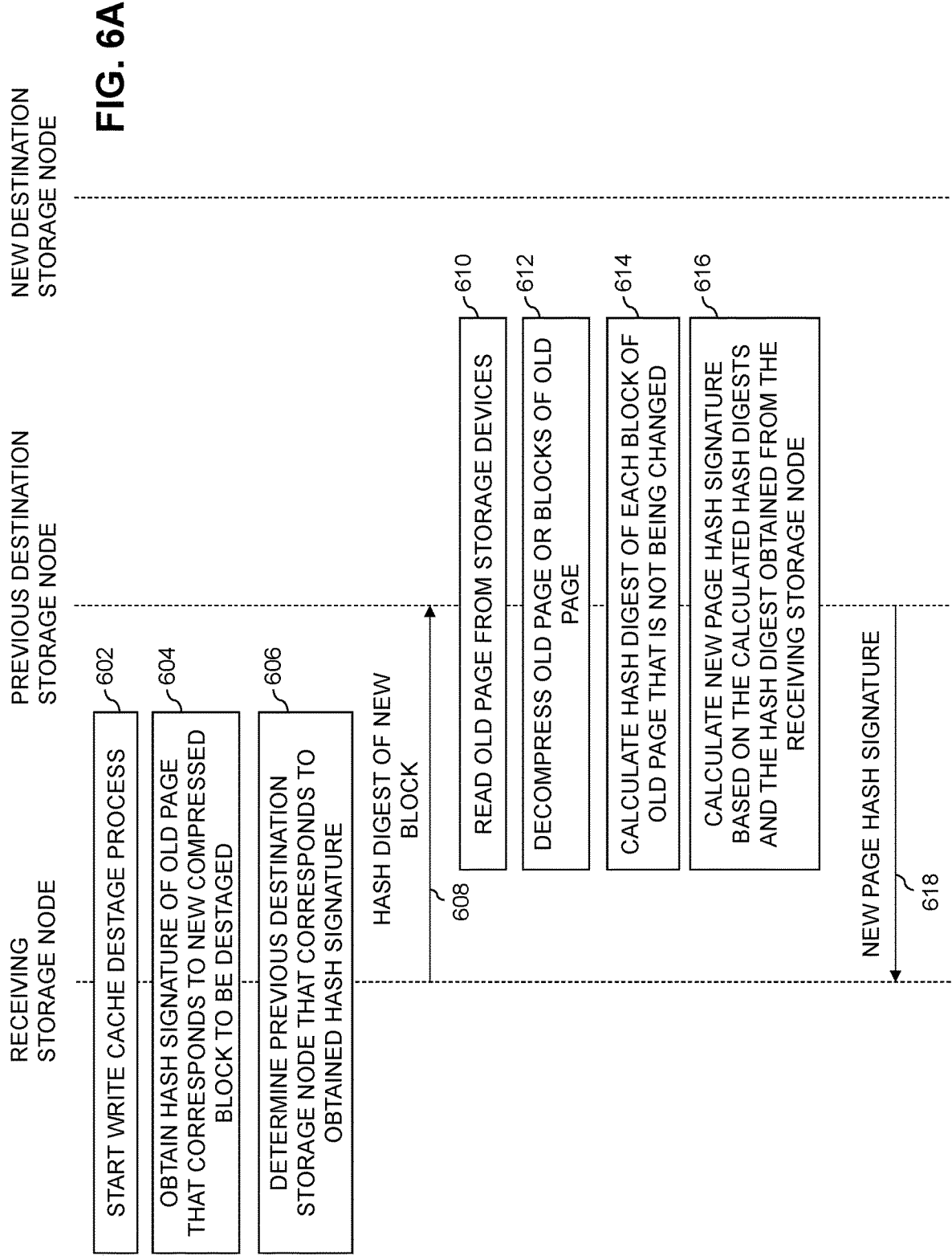

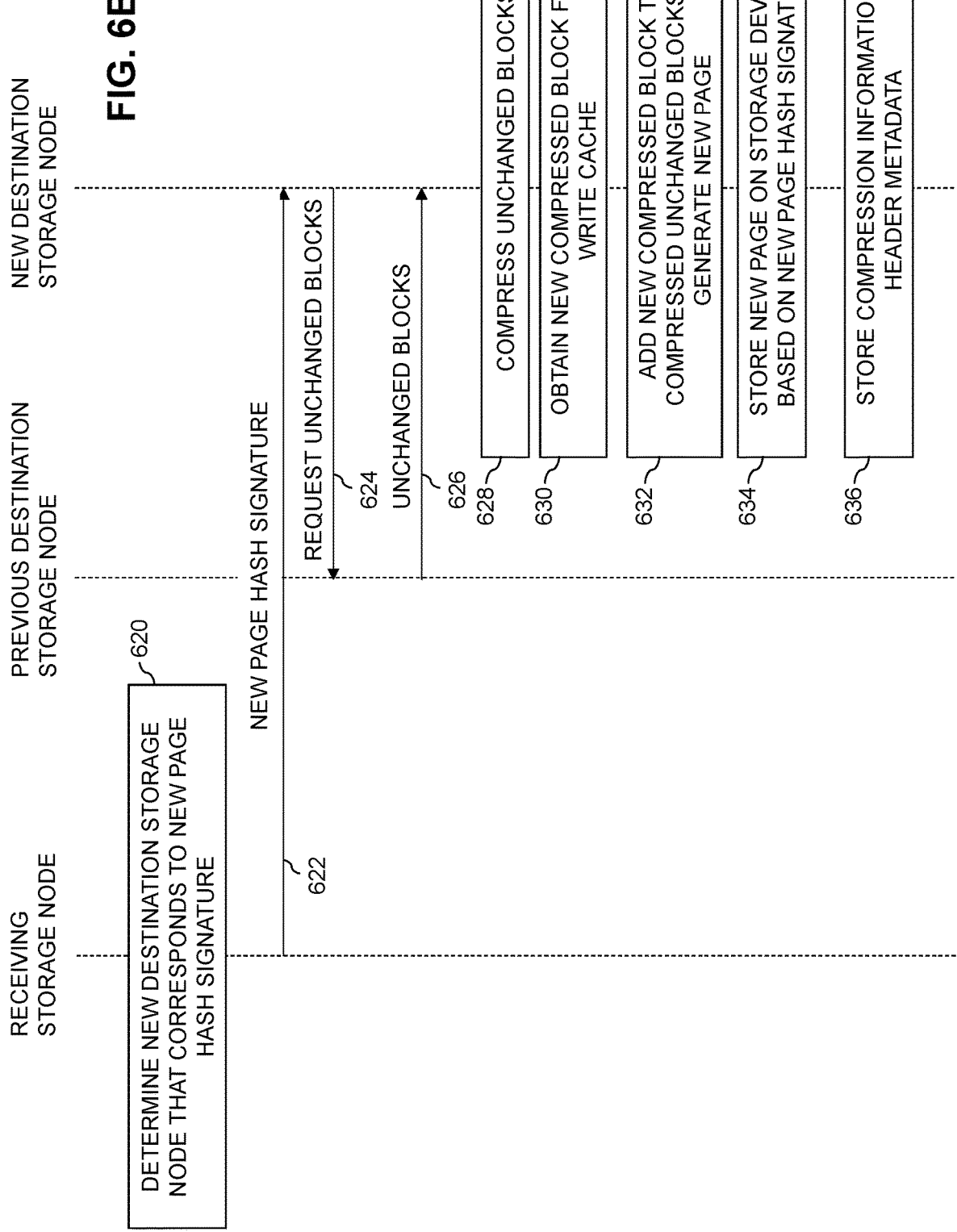

FRONT-END OFFLOAD OF STORAGE SYSTEM HASH AND COMPRESSION PROCESSING

FIELD

The field relates generally to information processing systems, and more particularly to storage in information processing systems.

BACKGROUND

In many information processing systems, storage systems are key elements. Storage systems, such as block-based storage systems, are designed to store and retrieve large amounts of data. To store a block of data, a host device typically provides a data block address and data block content to a storage system. The host device also provides the data block address to the storage system to retrieve the data block content stored in the storage system at a physical address. Some storage solutions rely on address-based mapping of data, as well as address-based functionality of a storage system's internal algorithms. For example, computing applications typically rely on address-based mapping and identification of data that is stored and retrieved. Another solution, in which data is mapped internally within a storage system and managed based on its content instead of its address, can provide various substantial advantages. For example, such a content-based storage solution improves storage capacity efficiency since any duplicate data blocks will only occupy the actual capacity of a single instance of that data block. As another example, the content-based storage solution can improve performance since duplicate block writes do not need to be executed internally in the storage system. Content-based storage solutions, however, face various challenges.

SUMMARY

In an illustrative embodiment, an apparatus is disclosed. The apparatus comprises a storage system comprising a front-end device, a first storage node corresponding to the front-end device and a plurality of storage devices. The first storage node comprises at least one processor and memory that are separate from the front-end device. The front-end device is configured to obtain a write operation. The write operation comprises at least a first block of data. The front-end device is configured to calculate a hash digest based at least in part on the first block of data and to provide the hash digest to the at least one processor. The at least one processor is configured to identify a first data page that comprises a second block of data that is a target for replacement by the first block of data and to identify a second storage node based at least in part on the first data page. The at least one processor is configured to transmit the hash digest to the second storage node.

These and other illustrative embodiments include, without limitation, apparatus, systems, methods and processor-readable storage media.

BRIEF DESCRIPTION OF THE DRAWINGS

FIGS. 6A and 6B illustrate a sequence diagram showing an example process for performing a destage process in accordance with the functionality for front-end offloading of storage system processing in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
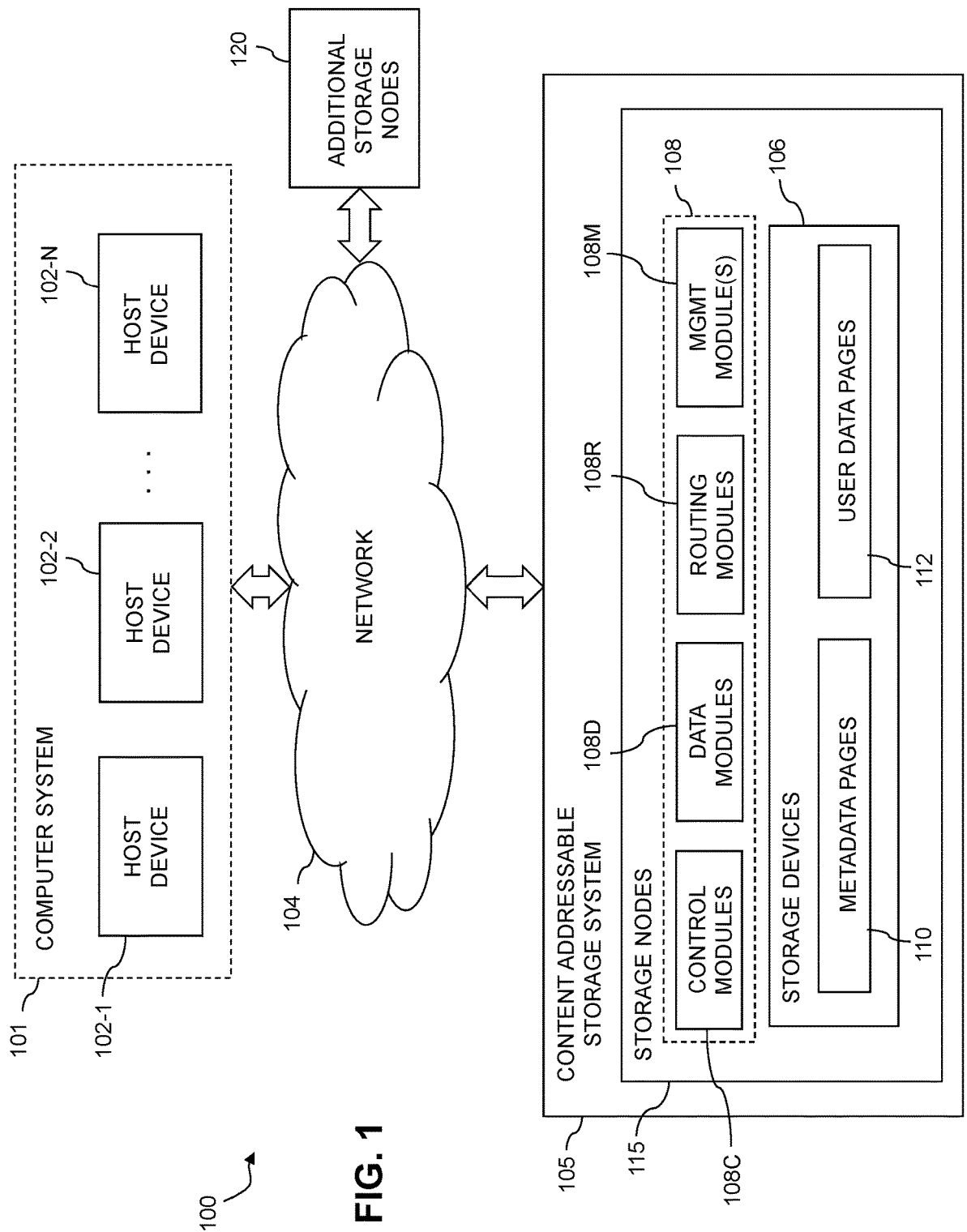
FIG. 1 is a block diagram of an information processing system comprising a content addressable storage system configured for front-end offloading of storage system processing in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a content addressable storage system 105. The content addressable storage system 105 is an example of what is more generally referred to herein as a "storage system," and it is to be appreciated that a wide variety of other types of storage systems can be used in other embodiments. In illustrative embodiments, the content addressable storage system 105 utilizes both content-based mapping and address-based mapping of logical addresses to physical addresses.

The host devices 102 and content addressable storage system 105 illustratively comprise respective processing devices of one or more processing platforms. For example, the host devices 102 and the content addressable storage system 105 can each comprise one or more processing devices each having a processor and a memory, possibly implementing virtual machines and/or containers, although numerous other configurations are possible.

The host devices 102 and content addressable storage system 105 may be part of an enterprise computing and storage system, a cloud-based system or another type of system. For example, the host devices 102 and the content addressable storage system 105 can be part of cloud infrastructure such as an Amazon Web Services (AWS) system. Other examples of cloud-based systems that can be used to provide one or more of host devices 102 and content addressable storage system 105 include Google Cloud Platform (GCP) and Microsoft Azure.

The host devices 102 are configured to write data to and read data from the content addressable storage system 105. The host devices 102 and the content addressable storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, an infrastructure-as-a-service (IaaS) model and/or a function-as-a-service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the host devices 102 over the network 104. The content addressable storage system 105 comprises a plurality of storage devices 106 and an associated storage controller 108. The storage devices 106 illustratively store metadata pages 110 and user data pages 112. The user data pages 112 in some embodiments are organized into sets of logical units (LUNs) each accessible to one or more of the host devices 102. The LUNs may be viewed as examples of what are also referred to herein as logical storage volumes of the content addressable storage system 105.

In some embodiments, the storage devices 106 may implement at least one redundant array of independent disks (RAID) 6 arrangement involving multiple ones of the storage devices 106. Additional or alternative RAID or non-RAID arrangements can be used to store data in the content addressable storage system 105.

The RAID 6 arrangement in this embodiment illustratively includes an array of different "disks," each a different physical storage device of the storage devices 106. Multiple such physical storage devices are typically utilized to store data of a given LUN or other logical storage volume in the content addressable storage system 105. For example, data pages or other data blocks of a given LUN or other logical storage volume can be "striped" along with its corresponding parity information across multiple ones of the disks in the RAID 6 arrangement.

A given RAID 6 arrangement in an illustrative embodiment defines block-level striping with double distributed parity and provides fault tolerance of two drive failures, so that the array continues to operate with up to two failed drives, irrespective of which two drives fail. In the RAID 6 arrangement, data blocks and corresponding p-type and q-type parity information are arranged in a row or stripe. Other data and parity blocks in the RAID 6 arrangement are distributed over the disks in a similar manner, collectively providing a diagonal-based configuration for the p-type and q-type parity information. Other types of RAID implementations can be used, as will be appreciated by those skilled in the art, possibly using error correcting codes in place of parity information.

Additional details regarding exemplary techniques for storing data in RAID arrays such as a RAID 6 arrangement are disclosed in U.S. Pat. No. 9,552,258, entitled "Method and System for Storing Data in RAID Memory Devices," which is incorporated by reference herein.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash content addressable storage array such as an XtremIO™ storage array commercially available from Dell EMC. For example, the content addressable storage system 105 can comprise an otherwise conventional XtremIO™ storage array or other type of content addressable storage system that is suitably modified to incorporate address mapping logic as disclosed herein. Other types of storage arrays, including by way of example VNX®, Symmetrix VMAX®, Unity™ or PowerMax™ storage arrays, also commercially available from Dell EMC, can be used to implement the content addressable storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing content addressable storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, such additional storage nodes 120 may be part of another clustered storage system of the system 100. Each of the storage nodes 115 of the content addressable storage system 105 is assumed to be implemented using at least one processing device comprising a processor coupled to a memory.

Other arrangements of storage nodes or other types of nodes can be used. The term "node" as used herein is intended to be broadly construed and a given such node need not include storage devices.

The storage controller 108 in this embodiment is implemented in a distributed manner so as to comprise a plurality of distributed storage controller components implemented on respective ones of the storage nodes 115. The storage controller 108 is therefore an example of what is more generally referred to herein as a "distributed storage controller." Accordingly, in subsequent description herein, the storage controller 108 is more particularly referred to as a distributed storage controller. Other types of potentially non-distributed storage controllers can be used in other embodiments.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management (MGMT) modules 108M. For example, only a single one of the storage nodes 115 may include a management module 108M. It is also possible that management modules 108M may be implemented on each of at least a subset of the storage nodes 115.

Each of the storage nodes 115 of the content addressable storage system 105 therefore comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

Communication links may be established between the various processing modules of the distributed storage controller 108 using well-known communication protocols such as IP, Transmission Control Protocol (TCP), and remote direct memory access (RDMA). For example, respective sets of IP links used in data transfer and corresponding messaging could be associated with respective different ones of the routing modules 108R.

It is assumed in some embodiments that the processing modules of the distributed storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The distributed storage controller 108 of the content addressable storage system 105 in the present embodiment is configured to control the implementation of functionality for front-end offloading of storage system processing as disclosed herein. The distributed storage controller 108 is assumed to comprise a type of "processing device" as that term is broadly used herein, and more particularly comprises at least one processor coupled to a memory.

Various aspects of page storage in the content addressable storage system 105 will now be described in greater detail. As indicated above, the storage devices 106 are configured to store metadata pages 110 and user data pages 112, and in some embodiments may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

The term "page" as used herein is intended to be broadly construed so as to encompass any of a wide variety of different types of blocks that may be utilized in a block storage device of a storage system. Such storage systems are not limited to content addressable storage systems of the type disclosed in some embodiments herein, but are more generally applicable to any storage system that includes one or more block storage devices. Different native page sizes are generally utilized in different storage systems of different types. For example, XtremIO™ X1 storage arrays utilize a native page size of 8 KB, while XtremIO™ X2 storage arrays utilize a native page size of 16 KB. Larger native page sizes of 64 KB and 128 KB are utilized in VMAX® V2 and VMAX® V3 storage arrays, respectively. The native page size generally refers to a typical page size at which the storage system ordinarily operates, although it is possible that some storage systems may support multiple distinct page sizes as a configurable parameter of the system. Each such page size of a given storage system may be considered a "native page size" of the storage system as that term is broadly used herein.

A given "page" as the term is broadly used herein should therefore not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 110 and the user data pages 112.

The user data pages 112 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 112 can include any type of user data that may be utilized in the system 100. The term "user data" herein is therefore also intended to be broadly construed.

The content addressable storage system 105 is configured to generate hash metadata providing a mapping between content-based digests of respective ones of the user data pages 112 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 112.

In illustrative embodiments, the content addressable storage system 105 is also configured to generate hash metadata providing a mapping between logical addresses and corresponding physical locations in the user data area that are not content-based. For example, the hash metadata may be based on hashes of the logical block addresses themselves.

The hash metadata generated by the content addressable storage system 105, whether content-based or address-based, is illustratively stored as metadata pages 110 in the metadata area. The generation and storage of the hash metadata is assumed to be performed under the control of the distributed storage controller 108.

Each of the metadata pages 110 characterizes a plurality of the user data pages 112. For example, a given set of user data pages representing a portion of the user data pages 112 illustratively comprises a plurality of user data pages denoted User Data Page 1, User Data Page 2, . . . User Data Page n.

Each of the user data pages 112 in this example is characterized by a LUN identifier, an offset and a hash value. The hash value is either a content-based signature generated as a hash function of content of the corresponding user data page or an address-based hash of a logical address. Illustrative hash functions that may be used to generate the content-based signature or address-based hash include the SHA1 hash function, where SHA denotes Secure Hashing Algorithm, or other secure hashing algorithms known to those skilled in the art, including SHA2, SHA256 and many others. The content-based signatures and address-based hashes are utilized to determine the location of the corresponding user data page within the user data area of the storage devices 106.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 110 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and hash values for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 105 is illustratively distributed among the control modules 108C.

The functionality for front-end offloading of storage system processing in this embodiment is assumed to be distributed across multiple distributed processing modules, including at least a subset of the processing modules 108C, 108D, 108R and 108M of the distributed storage controller 108.

For example, the management module 108M of the distributed storage controller 108 may include mapping logic that engages or otherwise interacts with corresponding control logic instances in at least a subset of the control modules 108C, data modules 108D and routing modules 108R in order to implement content-based and address-based mapping of logical addresses to physical addresses.

In some embodiments, the content addressable storage system 105 comprises an XtremIO™ storage array suitably modified to incorporate techniques for front-end offloading of storage system processing as disclosed herein.

In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module (SYM module) of the XtremIO™ storage array, although other types and arrangements of system-wide management modules can be used in other embodiments. Accordingly, functionality for front-end offloading of storage system processing in some embodiments is implemented under the control of at least one system-wide management module of the distributed storage controller 108, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller 108 in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 108C such that control of the slices within the distributed storage controller 108 is substantially evenly distributed over the control modules 108C of the distributed storage controller 108.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 105 each illustratively comprise one or more input-output (IO) operations directing that at least one data item of the content addressable storage system 105 be written to in a particular manner. A given write request is illustratively received in the content addressable storage system 105 from a host device, illustratively one of the host devices 102. In some embodiments, a write request is received in the distributed storage controller 108 of the content addressable storage system 105, and directed from one processing module to another processing module of the distributed storage controller 108. For example, a received write request may be directed from a routing module 108R of the distributed storage controller 108 to a particular control module 108C of the distributed storage controller 108. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 115 communicate with one another over a high-speed internal network such as an InfiniBand network. The C-modules, D-modules and R-modules coordinate with one another to accomplish various IO processing tasks.

The write requests from the host devices 102 identify particular data pages to be written in the content addressable storage system 105 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The content addressable storage system 105 utilizes a two-level mapping process to map logical block addresses to physical addresses. The first level of mapping uses an address-to-hash (A2H) table and the second level of mapping uses a hash metadata (HMD) table, with the A2H and HMD tables corresponding to respective logical and physical layers of the content-based and address-based signature mapping within the content addressable storage system 105.

The HMD table or a given portion thereof in some embodiments disclosed herein is more particularly referred to as a hash-to-data (H2D) table.

The first level of mapping using the A2H table associates logical addresses with respective hash values. For example, content-based mapping may associate logical addresses of respective data pages with respective content-based signatures of those data pages. Address-based mapping may associate logical addresses with respective hashes of those logical addresses. This is also referred to as logical layer mapping. For example, each entry in the A2H table includes a logical block address and the hash value, e.g., a content-based signature or hash handle or a hash of the logical block address. In some embodiments, the logical block address may be used as a key for accessing the entries in the table.

The second level of mapping using the HMD table associates respective ones of the hash values with respective physical storage locations in one or more of the storage devices 106. This is also referred to as physical layer mapping. For example, an entry in the H2D table may include a hash value, a reference count, and a physical offset for the data page. In some embodiments, the hash value may be used as a key for accessing the entries in the H2D table.

For a given write request, both of the corresponding H2D and A2H tables are updated in conjunction with the processing of that write request.

The A2H and H2D tables described above are examples of what are more generally referred to herein as "mapping tables" of respective first and second distinct types. Other types and arrangements of mapping tables or other content-based signature mapping information may be used in other embodiments.

Such mapping tables are still more generally referred to herein as "metadata structures" of the content addressable storage system 105. It should be noted that additional or alternative metadata structures can be used in other embodiments. References herein to particular tables of particular types, such as A2H, H2D, and HMD tables, and their respective configurations, should be considered non-limiting and are presented by way of illustrative example only.

The logical block addresses or LBAs of a logical layer of the content addressable storage system 105 correspond to respective physical blocks of a physical layer of the content addressable storage system 105. The user data pages of the logical layer are organized by LBA and are referenced via respective hash values to particular physical blocks of the physical layer using the A2H and HMD tables.

Each of the physical blocks has an associated reference count that is maintained within the content addressable storage system 105, e.g., within the H2D table. The reference count for a given physical block indicates the number of logical blocks that point to that same physical block, e.g., the block found at the corresponding physical offset in the H2D table.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for front-end offloading of storage system processing in other embodiments.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

As indicated previously, the host devices 102 and content addressable storage system 105 in the FIG. 1 embodiment are assumed to be implemented using at least one processing platform, each comprising one or more processing devices each having a processor coupled to a memory. Such processing devices can illustratively include particular arrangements of compute, storage and network resources.

The host devices 102 and the content addressable storage system 105 may be implemented on respective distinct processing platforms, although numerous other arrangements are possible. For example, in some embodiments at least portions of the host devices 102 and the content addressable storage system 105 are implemented on the same processing platform. The content addressable storage system 105 can therefore be implemented at least in part within at least one processing platform that implements at least one of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and the content addressable storage system 105 to reside in different data centers. Numerous other distributed implementations of the host devices 102 and/or the content addressable storage system 105 are possible. Accordingly, the content addressable storage system 105 can also be implemented in a distributed manner across multiple data centers.

Additional examples of processing platforms utilized to implement host devices and/or storage systems in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types and arrangements of system components such as host devices 102, network 104, content addressable storage system 105, storage devices 106, storage controllers 108 and storage nodes 115 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in some embodiments, at least portions of the functionality for front-end offloading of storage system processing as disclosed herein can be implemented in a host device, in a storage system, or partially in a host device and partially in a storage system.

Illustrative embodiments are therefore not limited to arrangements in which all such functionality is implemented in a host device or a storage system, and therefore encompass various hybrid arrangements in which the functionality is distributed over one or more host devices and one or more storage systems, each comprising one or more processing devices.

Figure 2:
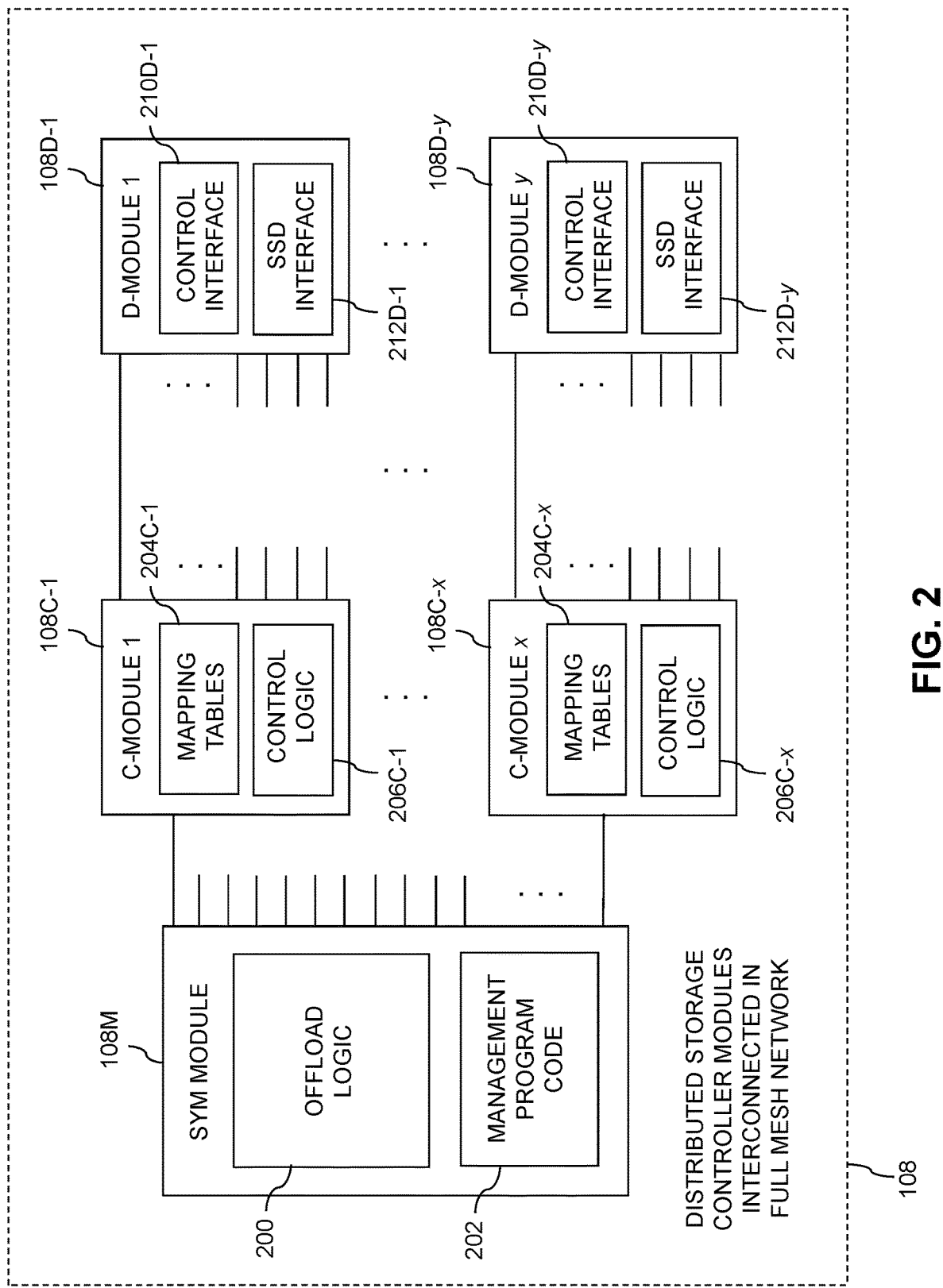
FIG. 2 illustrates a portion of a distributed storage controller of a content addressable storage system showing one possible arrangement utilizing control modules and data modules interconnected by a mesh network and configured for front-end offloading of storage system processing in an illustrative embodiment.

Referring now to FIG. 2, a more detailed view of a portion of the distributed storage controller 108 in an illustrative embodiment is shown. This embodiment illustrates an example arrangement of control modules 108C, data modules 108D and a management module 108M of the distributed storage controller 108. It is assumed in this embodiment that these and possibly other modules of the distributed storage controller 108 are interconnected in a full mesh network, such that each of the modules can communicate with each of the other modules, although other types of networks and different module interconnection arrangements can be used in other embodiments.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises offload logic 200 and associated management program code 202. The management module 108M communicates with control modules 108C-1 through 108C-x, also denoted as C-module 1 through C-module x. The control modules 108C communicate with data modules 108D-1 through 108D-y, also denoted as D-module 1 through D-module y. The variables x and y are arbitrary integers greater than one, and may but need not be equal. In some embodiments, each of the storage nodes 115 of the content addressable storage system 105 comprises one of the control modules 108C and one of the data modules 108D, as well as one or more additional modules including one of the routing modules 108R. A wide variety of alternative configurations of nodes and processing modules are possible in other embodiments. Also, the term "storage node" as used herein is intended to be broadly construed, and may comprise a node that implements storage control functionality but does not necessarily incorporate storage devices.

The control modules 108C-1 through 108C-x in the FIG. 2 embodiment comprise respective sets of mapping tables 204C-1 through 204C-x, e.g., sets of A2H and H2D tables. The A2H tables are utilized to store address-to-hash mapping information and the H2D tables are utilized to store hash-to-data mapping information, in support of mapping of logical addresses for respective pages to corresponding physical addresses for those pages via respective hashes or other types of content-based or address-based signatures, as described in further detail elsewhere herein. The control modules 108C-1 through 108C-x further comprise corresponding instances of control logic 206C-1 through 206C-x that interact with the offload logic 200 of the management module 108M to support front-end offloading of storage system processing as disclosed herein. While described as being included in the control modules 108C, in some embodiments, some or all of the mapping tables 204C may also or alternatively be included in other modules of the storage controller 108 such as, e.g., the data modules 108D. For example, in some embodiments, the A2H tables may be included in the control modules 108C while the H2D tables may be included in the data modules 108D. Any other arrangement for the mapping tables 204C may also or alternatively be used.

The control modules 108C may further comprise additional components not explicitly shown in FIG. 2, such as respective messaging interfaces that are utilized by the control modules 108C to generate control-to-routing messages for transmission to the routing modules 108R, and to process routing-to-control messages received from the routing modules 108R. Such messaging interfaces can also be configured to generate messages for transmission to the management module 108M and to process instructions and other messages received from the management module 108M.

The data modules 108D-1 through 108D-y in the FIG. 2 embodiment comprise respective control interfaces 210D-1 through 210D-y. These control interfaces 210D support communication between the data modules 108D and corresponding ones of the control modules 108C. Also included in the data modules 108D-1 through 108D-y are respective SSD interfaces 212D-1 through 212D-y. These SSD interfaces 212D support communications with corresponding ones of the storage devices 106. As mentioned above, in some embodiments, some or all of the mapping tables 204C may also or alternatively be included in the data modules 108D.

Figure 3:
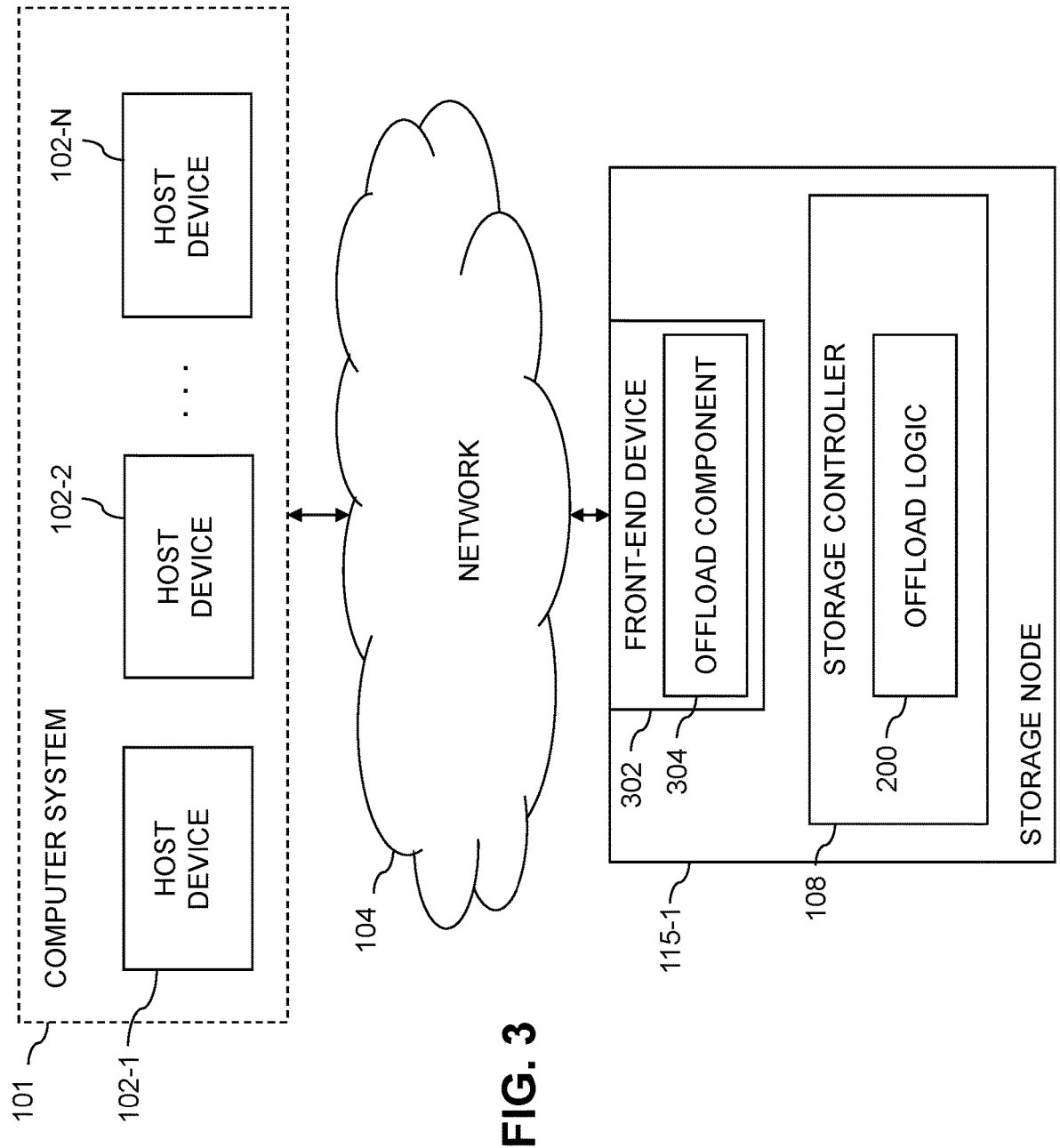
FIG. 3 illustrates an example storage node of a content addressable storage system in an illustrative embodiment.

With reference to FIG. 3, an example storage node 115-1 comprises a storage controller 108 and a front-end device 302 that supports communication with the host devices 102 via the network 104. The front-end device 302 may comprise, for example, network interface circuitry such as, e.g., a Network Interface Card (NIC), smart NIC, FPGA, system on chip (SOC) or other circuitry that is configured to process incoming transmissions from the host devices 102 via the network 104 and to transmit responses back to the host devices 102. The front-end device 302 may also be configured to support Remote Direct Memory Access (RDMA). In illustrative embodiments, the front-end device 302 is separate from the storage controller 108 and comprises separate processing capabilities and circuitry from the processors and circuitry of the storage controller 108. Any of the storage nodes 115 may also comprise similar components and functionality to those described herein for storage node 115-1.

In a typical CAS system, a substantial amount of the processing resources of the storage controller are spent on calculating hash signatures for uniquely identifying data blocks and on the compression of the data blocks for data reduction and storage efficiency purposes. These calculations have both direct and indirect implications on the system performance. For example, this processing can leave fewer available processing cycles for the performance of other operations by the storage controller. In addition, the later in the write flow that the compression is performed, the greater the amount of processing resources that need to be devoted to processing uncompressed data, which may cause inefficiencies in the utilization of the processing and storage resources and may become a bottleneck that limits the system performance.

For example, in order to improve the latency of write IO operations, a typical storage system uses a write cache component backed by a write cache journal to store data buffers of write IO operations in a non-volatile storage media such as NVRAM. After persisting the data buffer in the write cache journal, the write IO operation may be acknowledged even though the data has not yet been destaged to persist the data to the storage devices. The destaging is then performed asynchronously as processing resources become available or as the size or number of entries in the write cache journal exceed a threshold amount.

As an example, the typical write flow may comprise the following steps:

1. A write IO operation is received by a storage node and the data buffer corresponding to the write IO operation is stored uncompressed in the write cache journal. The IO is then acknowledged.

2. The content-based signatures or hash handles are calculated for the data buffer by the storage controller of the storage node and a destination storage node is selected, e.g., based on a Hash-to-Node mapping table that maps the ownership of each content-based signature to one of the storage nodes. The destination storage node may be any storage node in the storage system.

3. The data buffer is transferred to the destination storage node over the network.

4. The storage controller of the destination storage node compresses the data buffer and the compressed data buffer is written to storage devices.

As mentioned above, the calculation of the content-based signature and the compression of the data buffer by the storage controllers of the storage nodes require significant processing resources. In addition, because the compression is performed after the data buffer is written to the write cache journal, the write cache journal stores the uncompressed data buffer. Since the write cache journal memory is limited, storing uncompressed data may result in inefficiencies and may become a bottleneck which limits the performance of the storage system.

In some cases, the processing of small blocks (i.e., blocks that are smaller than the fixed-size granularity) may also be supported by a storage system. For example, for a storage system that uses a 16 KB fixed-size page granularity, read and write IO operations having data sizes of 2 KB, 4 KB, 8 KB or other sizes smaller than the 16 KB page granularity may also be supported. A read IO operation for a 4 KB block of data in a typical storage system requires that the storage system read a full 16 KB page from memory, decompress the 16 KB page and fetch the requested 4 KB block of data after the decompression. Similarly, a write request of a 4 KB block of data in a typical storage system requires that the full 16 KB page be read from memory and that the corresponding 4 KB block of data within the read 16 KB page be updated with the data of the new 4 KB block.

The processing of a small write IO operation for a 4 KB block of data in such a storage system may comprise the following steps:

1. The small write IO operation comprising the 4 KB block of data is obtained by a receiving storage node and the data buffer corresponding to the small write IO operation is stored uncompressed in the write cache journal. The IO is then acknowledged to the host device.

2. The hash signature for the address of the 16 KB page that corresponds to the small write IO operation is retrieved from internal metadata.

3. An identification of the destination storage node that handled the processing of the 16 KB page that corresponds to the small write IO operation is retrieved from internal metadata.

4. A message is sent to the destination storage node with a pointer to the new 4 KB block of data for the small write IO operation.
   a. The destination storage node reads the 16 KB page from the corresponding storage devices.
   b. The destination storage node obtains the new 4 KB block of data from the receiving storage node the over the network.
   c. The destination storage node updates the 16 KB page with the new small 4 KB block to construct a new 16 KB page, for example, by replacing an existing 4 KB block of the 16 KB page with the new small 4 KB block. The destination storage node calculates the hash signature of the new page and replies to the receiving storage node with the new hash signature and a pointer to the constructed new full page.

5. Based on the new hash signature, the receiving storage node determines a new destination storage node from the internal metadata and sends a write IO operation to the new destination storage node to write the constructed 16 KB page.

6. The new destination storage node compresses the constructed 16 KB page and writes the compressed 16 KB page to the storage devices.

In some cases, such as a 4 KB or 8 KB random write, the processing resources of the storage system may become a performance bottleneck. For example, performing calculations to generate hash signatures and compression by the processing resources degrades the system performance both directly and indirectly. For example, such processing leaves fewer processing resource cycles available for performing other storage system operations. In addition, by performing the compression late in the process, e.g., right before storing the data on the storage devices in order to reduce the IO latency, the data is written in uncompressed form to the write cache journal. Since the write cache journal has a limited amount of available memory, the writing of such uncompressed data may be inefficient and the memory and network bandwidth that is utilized for the movement of such data to and from the write cache journal may also become a bottleneck potentially limits the storage system performance.

In illustrative embodiments, the front-end device 302 comprises an offload component 304 that is configured to perform processing operations on incoming write IO operations and to operate in conjunction with corresponding offload logic 200 of the storage controller 108. The offload component 304 may comprise dedicated circuitry, for example, in the form of an FPGA or SOC, or may comprise software running on one or more processing devices of the front-end device 302.

The generation of the content-based signatures and the data compression for at least some of the data in the data buffer of a write IO operation is performed by the offload component 304 of the front-end device 302 which initially obtains the write IO operation, e.g., offloaded to the front-end device 302, instead of being performed by the processing resources of the storage controller 108 of the receiving and destination storage nodes 115. For example, the offload component 304 may comprise hash calculation and compression engines which offload these processor intensive activities from the processing resources of the storage controller 108. By performing at least some of these calculations prior to storing the data in the write cache component or delivering the write IO operation and data buffer to the processing resources of the receiving storage node 115 or the destination storage node 115, the required bandwidth for transferring the data buffer between storage nodes 115 and to the write cache component will be reduced while the effective size of the write cache journal will be increased. For example, for a 2:1 compression the effective write cache size is doubled thereby allowing the write cache to store more entries before destaging.

In an illustrative embodiment, an example hash calculation and compression offload for a write IO operation utilizing offload component 304 and offload logic 200 will now be described.

In conjunction with the front-end device 302 of receiving storage node 115 obtaining a small write IO operation from a host device 102, the offload component 304 of the front-end device 302 is configured to calculate a hash digest for each aligned block of a predetermined block size, e.g., that is smaller than the fixed-size page granularity of the storage system. In some embodiments, for example, the predetermined block size may comprise 2 KB, 4 KB, 8 KB or any other block size that forms a portion of a page. As an example, in a case where the fixed-size page granularity is 16 KB, the predetermined small block size may be 4 KB where each 16 KB page comprises four 4 KB blocks of data, e.g., P=[B0, B1, B2, B3] where P refers to the page and B # refers to a given block of the page P. The hash digest for each block is stored in write cache. For example, where the write IO operation comprises 4 KB of data and the content addressable storage system 105 has a 16 KB fixed-size page granularity with a block size of 4 KB, the offload component 304 will generate a hash digest from the 4 KB block of data. In another example, where the write IO operation comprises 12 KB of data and the content addressable storage system 105 has a 16 KB fixed-size page granularity with a block size of 4 KB, the offload component 304 will generate a hash digest for each 4 KB block of data, e.g., one for each aligned 4 KB block of the write IO operation.

The offload component 304 of the front-end device 302 is also configured to perform compression on the incoming blocks. For example, the offload component 304 is configured to compresses each aligned block of the predetermined size, e.g., each 4 KB block in the above example, and generate compression information for each compressed block. For example, the compression information may comprise a compression indicator, a compression type and a compression size. The compression indicator of the compression information indicates whether or not the block is compressed. The compression type indicates the type of data compression algorithm that is used. For example, the compression type may indicate which compression algorithm was used, the compression ratio that was used or any other information that may be needed to decompress the data. The compression size indicates the size of the compressed data.

The offload component 304 provides the compression information and the compressed data blocks to the offload logic 200 of the storage controller 108 of its corresponding storage node 115. The offload logic 200 of the storage controller 108 is configured to add the compressed blocks to the write cache component and associates the compression information with the corresponding write cache entries as part of their metadata such that a later read of the write cache entries, e.g., to service a read IO operation or destage the write cache data, will also include the corresponding compression information. The offload logic 200 may then acknowledge the write IO operation to the host device 102.

As part of an asynchronous process, e.g., destaging of the write cache, the offload logic 200 is further configured to determine the previous destination storage node 115 associated with the data page corresponding to the small write IO request. For example, offload logic 200 obtains the page hash signature that corresponds to the data page that is the target of the small write IO operation, e.g., based at least in part on the HMD table, and determines the previous destination storage node 115 that handled IO operations for that page hash signature, for example, based at least in part on the Hash-to-Node mapping table.

The offload logic 200 is configured to submit a message to the previous destination storage node 115 that comprises the hash digests for the corresponding blocks of data that are being changed by the small write IO operation. For example, in a case where the small write IO operation comprises a new 4 KB block of data, e.g., block $B0_N$, the offload logic 200 will submit the hash digest associated with that new 4 KB block, e.g., $H(B0_N)$, that was stored in the write cache component to the previous destination storage node 115. Note that in typical storage systems, the data associated with the IO operation, e.g., the new 4 KB block of data $B0_N$ itself, would also be submitted to the previous destination storage node 115 but such a transfer of the 4 KB block of data $B0_N$, or the compressed 4 KB block of data $C(B0_N)$, is not necessary in illustrative embodiments as will be explained in more detail below.

As part of the asynchronous process, the previous destination storage node 115 obtains the data page corresponding to the page hash signature from the storage devices 106 and determines whether full-page compression was used for this data page or if this data page was alternatively stored using the disclosed compression process described below. If full-page compression was used, the destination storage node 115 decompresses the full data page. Alternatively, if each block of the data page was individually compressed, the destination storage node 115 decompresses each block of the data page individually. In some embodiments, the block of the data page that is being replaced by the new block of data $B0_N$ of the write IO operation may not need to be decompressed. In an example scenario, if the fixed-size page granularity is 16 KB, a data page P comprises four 4 KB blocks of data, B0, B1, B2 and B3. The write IO operation in this example comprises a new 4 KB block of data, e.g., block $B0_N$, that will be used to replace the corresponding existing block of data B0. In this example scenario, if the blocks were individually compressed, it may only be necessary to decompress blocks B1, B2 and B3 since block B0 is being replaced anyway.

Once the page or individual blocks have been decompressed, the previous destination storage node 115 calculates hash digests for each of the blocks of the data page that are not being replaced. In the above example scenario, the previous destination storage node 115 calculates hash digests for blocks B1, B2 and B3, e.g., H(B1), H(B2) and H(B3), but not for block B0 which is being replaced.

The previous destination storage node 115 then calculates the new page hash value, $H(P_N)$, for the new page, $P_N$, based at least in part on the hash digests of the three 4 KB blocks of the data page, e.g., H(B1), H(B2) and H(B3), and the hash digest of the new 4 KB block, e.g., $H(B1_N)$ of the write IO operation that was obtained from the receiving storage node 115. For example, the new data page hash digest, $H(P_N)$, also sometimes referred to as the content-based signature of the new data page, $P_N$, is calculated as the hash of the concatenation of the four block hash digests, $H(P_N)=H(H(B0_N)+H(B1)+H(B2)+H(B3))$. The calculated hash digest $H(P_N)$ is then provided by the previous destination storage node 115 to the receiving storage node 115 as a reply to the message comprising the hash digest of the new 4 KB block $H(B0_N)$.

The receiving storage node 115 determines a new destination storage node 115 for the new data page $P_N$, e.g., based at least in part on the Hash-to-Node table and the calculated hash digest $H(P_N)$ received from the previous destination storage node 115, and submits a message to the new destination storage node 115 that corresponds to the hash digest $H(P_N)$ of the new data page $P_N$. The message may comprise an indication that the uncompressed blocks that have not changed for the new data page $P_N$ are stored in memory of the previous destination storage node 115, e.g., blocks B1, B2 and B3. The message may also or alternatively comprise an indication of the hash digest $H(P_N)$ of the new page $P_N$ or a location where the hash digest $H(P_N)$ of the new page $P_N$ may be obtained, e.g., from the previous destination storage node 115 or from the receiving storage node 115.

The new destination storage node 115 obtains the uncompressed blocks that have not changed from the previous destination storage node 115, e.g., based at least in part on the message received from the receiving storage node 115, and compresses them individually. For example, the new destination storage node 115 may compress the data of each of blocks B1, B2 and B3 to generate compressed blocks C(B1), C(B2) and C(B3) in the above example scenario. In illustrative embodiments, the new destination storage node 115 may also generate compression information for the compressed blocks C(B1), C(B2) and C(B3) similar to the compression information generated for the compression of the new block $B0_N$ by the offload component 304. For example, the compression information may comprise a compression indicator, a compression type and a compression size as described above.

In some embodiments, where the unchanged blocks were already compressed individually, the new destination storage node 115 may alternatively obtain the compressed versions of the unchanged blocks and their corresponding compression information, e.g., from the previous destination storage node 115 or from the storage devices 106. In such a case, no further compression on the unchanged blocks need be performed.

The new destination storage node 115 also obtains the already compressed new block $C(B0_N)$ from the write cache. The new destination storage node 115 may also obtain the compression information for the compressed new block $C(B0_N)$ from the write cache.

The new destination storage node 115 combines the compressed blocks to generate the new page $P_N$. It is important to note that while the hash digest for the new page $H(P_N)$ was generated based on the hashes of the data blocks, $H(B0_N)$, H(B1), H(B2) and H(B3) by the previous destination storage node 115, the new page $P_N$ was not generated at that time. Instead, in illustrative embodiments, the new page $P_N$ is generated by the new destination storage node 115 based on the compressed blocks $C(B0_N)$, C(B1), C(B2) and C(B3) and no further compression is performed on the page $P_N$ itself. While blocks $B0_N$, B1, B2 and B3 may each comprise 4 KB worth of uncompressed data in the example scenario, the compressed blocks $C(B0_N)$, C(B1), C(B2) and C(B3) may each be smaller than 4 KB and the final new page $P_N$ may also be smaller than the 16 KB fixed-size page granularity.

The new destination storage node 115 may then write the new page $P_N$ comprising the four compressed blocks $C(B0_N)$, C(B1), C(B2) and C(B3) to the corresponding location in the storage devices 106, e.g., based at least in part on the HMD table. In addition, the new destination storage node 115 updates the header metadata of the storage devices 106 to indicate that the new page $P_N$ is stored as four compressed blocks rather than as a compressed page. For example, a bit or other field of the header metadata may be set to a predetermined value that indicates that the page comprises individually compressed blocks. In some embodiments, for example, each page may have a corresponding entry in the header metadata that indicates whether the full page is compressed or the blocks of the page are compressed individually. In some embodiments, each page has its own header metadata that comprises an indication of whether the full page is compressed or the blocks of the page are compressed. In some embodiments, the header metadata may also comprise an indication of the compression information for the page or the compression information for each of the blocks depending on which compression is used. For example, if full page compression is utilized, the header metadata may comprise an indication that full page compression was utilized and also comprise the compression information for the full page. As another example, if the individual blocks of the page are compressed, the header metadata may comprise an indication that the individual blocks of the page are compressed and may comprise an entry for each block that comprises the corresponding compression information for that block.

When a read IO operation corresponding to blocks that are found in the write cache component is received, the offload logic 200 of the receiving storage node 115 will check the corresponding metadata for the compression information. If the compression information indicates that the blocks are compressed in the write cache component, offload logic 200 will decompress the blocks before providing the blocks to the host device 102 in response to the read IO operation, for example, using the parameters contained in the compression information such as, e.g., the compression type and the compression size.

When a read IO operation corresponding to blocks that are stored on the storage devices 106 is received, the offload logic 200 executing on the corresponding destination storage node 115 determines whether or not the data page comprising the corresponding blocks is stored on the storage devices 106 with full page compression or individual block compression, e.g., based on the indication stored in the header metadata. If the data is stored using full page compression, the full page may be obtained and decompressed by the destination storage node 115 using the compression information found in the header metadata. The block or blocks of the decompressed data page that correspond to the read IO operation may then be provided to the host device 102 that issued the read IO operation.

On the other hand, if the data is stored using individual block compression, the destination storage node 115 need only obtain and decompress the compressed block or blocks that correspond to the read IO operation instead of the full data page. The decompressed block or blocks may then be provided to the host device 102 that issued the read IO operation. In this manner, the processor utilization overhead associated with servicing read IO operations may be further reduced since only the specific data block or blocks necessary for responding to the read IO operation need be obtained and decompressed instead of the entire data page.

The disclosed offload component 304 and offload logic 200 improve the storage system performance in a number of ways. For example, the processor utilization of the receiving storage node 115 is reduced by offloading some of the processor intensive calculations for generating hash digests and compressing data to the front-end device 302 which frees up significant processor cycles to be available to the receiving storage node 115 for performing other storage system activities such as, e.g., read IO operations.

In addition, the amount of data stored in the write cache and write cache journal is effectively increased since compressed data takes up less storage capacity. This allows more data to be written to the write cache and write cache journal before requiring destaging.

NVRAM bandwidth is also increased, especially in big-blocks scenarios since by compressing the data, more original data can be written to the NVRAM for the same bandwidth.

The network bandwidth between the storage nodes 115 is also improved since only the hash digest of the new block of data is transferred to the previous storage node 115 for generation of the new page hash digest instead of the data or compressed data of the new block itself. The network bandwidth is also improved since at least some of the data being transferred between the storage nodes 115 is now compressed.

The processor utilization of the previous destination storage node 115 is also improved because the previous destination storage node 115 need only decompress and generate hash digests for the blocks of the corresponding data page that are not being updated by the incoming write IO operation when generating the new page hash digest. Likewise, the processor utilization of the new destination storage node 115 is improved because the new destinations storage node 115 need only compress the blocks that are not being updated since the compression of the new block of data has already been performed by the front-end device 302 of the receiving storage node 115. In some embodiments, where the unchanged blocks have already been compressed individually and are provided to the new destination storage device 115 in compressed form, no further compression of the blocks may be necessary by the new destination storage node 115 which further improves the processor utilization of the new destination storage node 115.

The operation of the information processing system 100 will now be described in further detail with reference to the flow diagrams of FIGS. 4-6.

Figure 4:
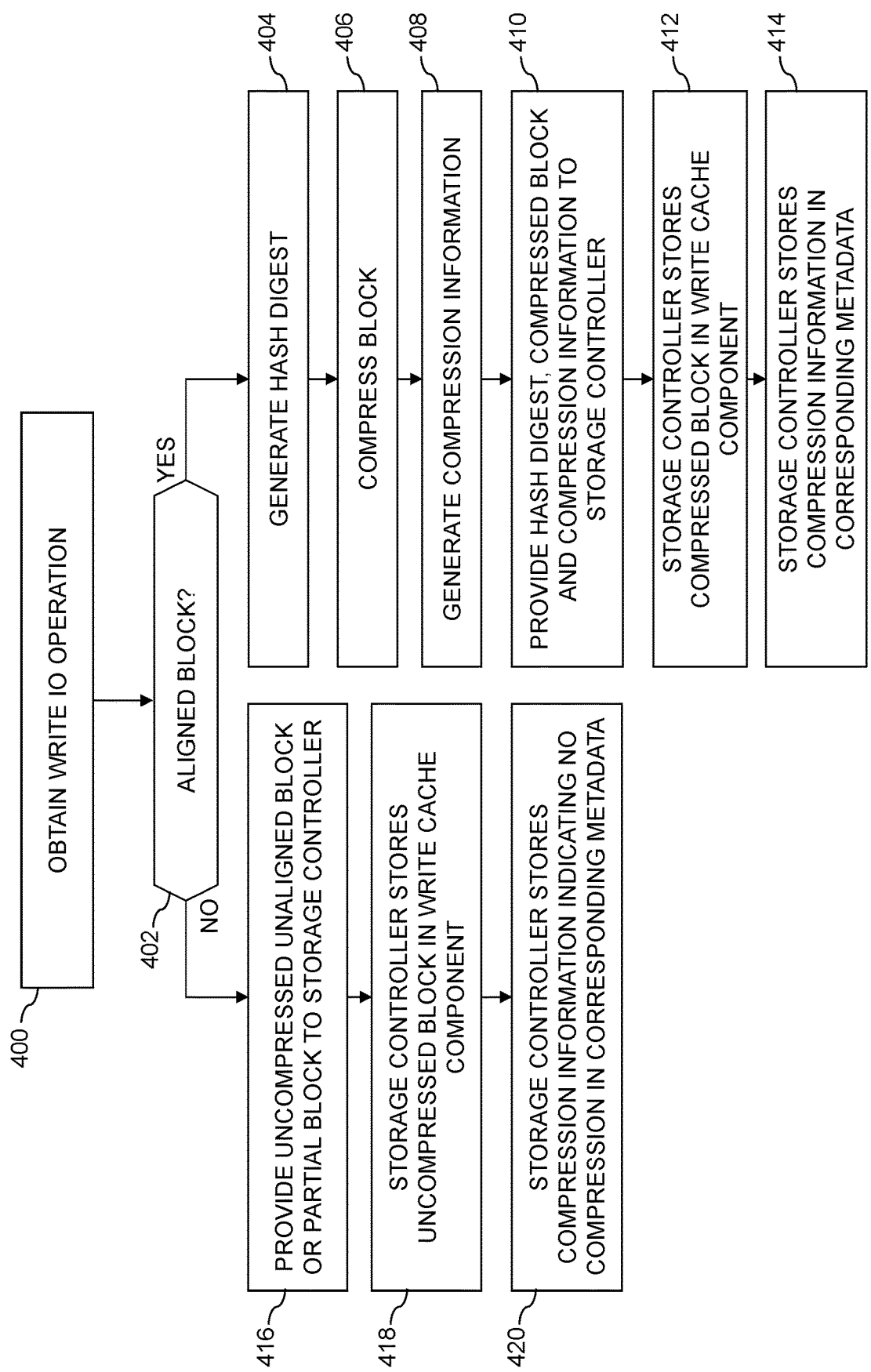
FIG. 4 illustrates a flow diagram showing an example process for processing a write input-output (IO) request in accordance with the functionality for front-end offloading of storage system processing in an illustrative embodiment.

The flow diagram of FIG. 4 illustrates an example process for processing a write IO operation by a receiving storage node 115 in accordance with the functionality for front-end offloading of storage system processing. The process of FIG. 4 includes steps 400 through 420, and is suitable for use in system 100 but is more generally applicable to other types of systems in which it is desirable to offload processing to a front-end device.

The steps of the flow diagrams of FIG. 4 are illustratively performed at least in part under the control of a front-end device and a storage controller of a storage node of a storage system.

At step 400, the front-end device 302 obtains a write IO operation, for example, from a host device 102.

At step 402, the offload component 304 of the front-end device 302 determines, for each block of data in the data buffer of the write IO operation, whether the block is an aligned block of data having a pre-determined size, e.g., a 4 KB block in the above example scenario. For example, if the data buffer has 12 KB of data and the fixed-size page granularity of the storage system is 16 KB data pages having four 4 KB blocks each, the offload component 304 would determine that the data buffer comprises three aligned 4 KB blocks of data. If the data buffer has 14 KB of data, the offload component 304 would determine that the data buffer comprises three aligned 4 KB blocks of data and one partial 2 KB block of data. In some cases, one or more blocks of data may alternatively be unaligned. If the blocks of data are aligned, the process proceeds to step 404 for each aligned block. Otherwise the process proceeds to step 416.

At step 404, offload component 304 generates a hash digest for each aligned block of data.

At step 406, offload component 304 compresses each aligned block of data individually.

At step 408, offload component 304 generates compression information for each compressed block of data, for example, as described above.

At step 410, offload component 304 provides the hash digest, compressed block of data and compression information for each aligned block to the storage controller.

At step 412, the storage controller 108 stores each compressed block of data in the write cache component.

At step 414, the storage controller 108 stores the compression information for each compressed block of data in the metadata corresponding to that compressed block of data.

Referring back to step 416, if there are any blocks of data that are not aligned or comprise a partial block of data, e.g., a 2 KB block of data, offload component 304 provides the uncompressed unaligned block of data or partial block of data to the storage controller 108.

At step 418, the offload logic 200 of the storage controller 108 stores the uncompressed unaligned or partial block of data in the write cache component.

At step 420, the offload logic 200 of the storage controller 108 stores compression information that indicates that no compression has been performed on the unaligned or uncompressed block of data in the metadata corresponding to the uncompressed unaligned or partial block of data.

Figure 5:
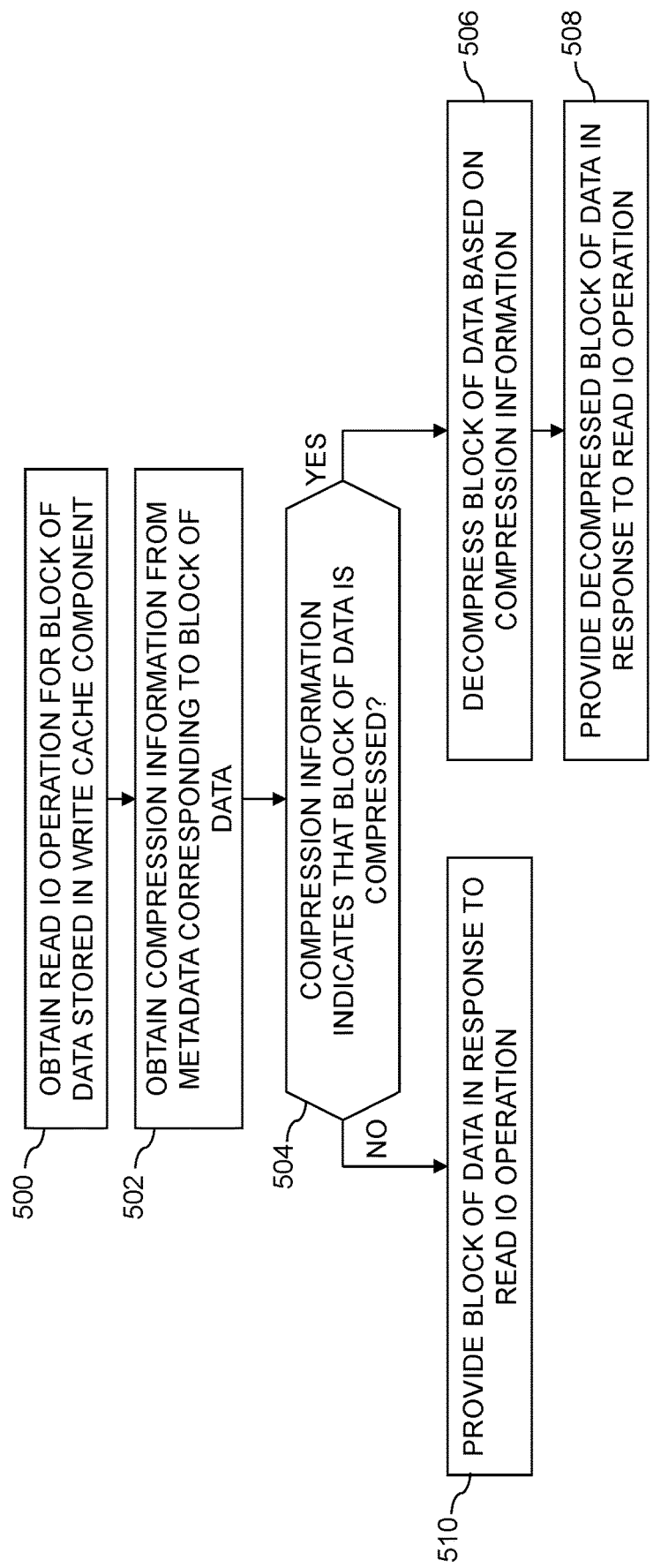
FIG. 5 illustrates a flow diagram showing an example process for processing a read IO operation in accordance with the functionality for front-end offloading of storage system processing in an illustrative embodiment.

The flow diagram of FIG. 5 illustrates an example process for processing a read IO operation in accordance with the functionality for front-end offloading of storage system processing. The process of FIG. 5 includes steps 500 through 510, and is suitable for use in system 100 but is more generally applicable to other types of systems in which it is desirable to offload processing to a front-end device.

The steps of the flow diagram of FIG. 5 are illustratively performed at least in part under the control of a storage controller of a storage system, such as the distributed storage controller 108 of content addressable storage system 105.

At step 500, the offload logic 200 of the storage controller 108 obtains a read IO operation for a block of data stored in the write cache component, e.g., from a host device 102.

At step 502, the offload logic 200 of the storage controller 108 obtains compression information for the block of data from the metadata corresponding to the data page.

At step 504, the offload logic 200 of the storage controller 108 determines whether or not the compression information indicates that the block of data is compressed. If the compression information indicates that the block of data is compressed, the process proceeds to step 506. If the compression logic indicates that the block of data is not compressed, the process proceeds to step 510.

At step 506, the offload logic 200 of the storage controller 108 decompresses the block of data based at least in part on the compression information, for example, using the compression type and compression size found in the compression information.

At step 508, the offload logic 200 of the storage controller 108 provides the decompressed block of data in response to the read IO operation.

Referring back to step 510, if the compression information indicates that the block of data is not compressed, the offload logic 200 of the storage controller 108 provides the block of data in response to the read IO operation.

The sequence diagram of FIG. 6 illustrates an example process for destaging the write cache component in accordance with the functionality for front-end offloading of storage system processing. The process of FIG. 6 includes steps 602 through 636, and is suitable for use in system 100 but is more generally applicable to other types of systems in which it is desirable to offload processing to a front-end device.

The steps of the sequence diagram of FIGS. 6A and 6B are illustratively performed at least in part under the control of the storage controllers of the storage nodes of a storage system, such as the distributed storage controller 108 of content addressable storage system 105.

At step 602, a receiving storage node 115 starts a write cache destage process, for example, when the number of entries or size of the entries in the write cache meets or exceeds a threshold value. The receiving storage node 115 may comprise, for example, the node that received or obtained an IO operation from a host device 102.

At step 604, the offload logic 200 of the receiving storage node 115 obtains the hash signature of the old page that corresponds to the new compressed block to be destaged. For example, the address storing the old page that is being modified or updated by the new compressed block of data may be identified, e.g., based on the corresponding IO operation, and the corresponding hash signature may be obtained from the HMD table.

At step 606, the offload logic 200 of the receiving storage node 115 identifies the previous destination storage node 115 that corresponds to the obtained hash signature, e.g., the storage node 115 that is responsible for handling IO operations associated with the old data page.

At step 608, the offload logic 200 of the receiving storage node 115 transmits the hash digest of the new compressed block to the previous destination storage node 115.

At step 610, the previous destination storage node 115 reads the old page from the storage devices 106.

At step 612, the previous destination storage node 115 decompresses the old page or blocks of the old page. For example, as described above, the old page may be stored either as a full-page compression format or as an individual block compression format. The previous destination storage node may determine which format was used and what type of compressions was used, for example, based at least in part on the indications and compression information stored in the header metadata as described above.

At step 614, the previous destination storage node 115 calculates a hash digest individually for each block of the old data page that is not being modified or replaced by the new data block.

At step 616, the previous destination storage node 115 calculates a new page hash signature based on the calculated hash digests of the blocks that are unchanged and the hash digest of the new block that was received from the receiving storage node 115.

At step 618, the previous destination storage node 115 transmits the new page hash signature to the receiving storage node 115.

At step 620, the receiving storage node 115 determines a new destination storage node 115 that corresponds to the new page hash signature, for example, based on the HMD table.

At step 622, the receiving storage node 115 transmits the new page hash signature to the new destination storage node 115.

At step 624, the new destination storage node 115 transmits a request to obtain the data of the unchanged blocks from previous destination storage node 115.

At step 626, the previous destination storage node 115 transmits the unchanged blocks to the new destination storage node 115.

At step 628, the new destination storage node 115 compresses each of the obtained the unchanged blocks of data individually.

At step 630, the new destination storage node 115 obtains the new compressed block of data from the write cache.

At step 632, the new destination storage node 115 adds the new compressed block to the compressed unchanged blocks to generate the new page.

At step 634, the new destination storage node 115 stores the new page on the storage devices 106 based on the new page hash signature.

At step 636, the new destination storage node 115 stores compression information for the new page in the header metadata on the storage devices 106 as described above.

The particular processing operations and other system functionality described above in conjunction with the flow diagrams of FIGS. 4-6 are presented by way of illustrative examples only, and should not be construed as limiting the scope of the disclosure in any way. Alternative embodiments can use other types of processing operations for implementing functionality for front-end offloading of storage system processing. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to handle multiple page ranges and associated metadata within a given storage system.

Functionality such as that described in conjunction with the flow diagrams of FIGS. 4-6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A storage controller such as distributed storage controller 108 that is configured to control performance of one or more steps of the processes of the flow diagrams of FIGS. 4-6 in system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 102 and content addressable storage system 105 of system 100, as well as other system components, may be implemented at least in part using processing devices of such processing platforms. For example, in the distributed storage controller 108, respective distributed modules can be implemented in respective containers running on respective ones of the processing devices of a processing platform.

Illustrative embodiments of storage systems with functionality for front-end offloading of storage system processing as disclosed herein can provide a number of significant advantages relative to conventional arrangements.

For example, some embodiments provide content addressable storage systems and other types of clustered storage systems that are configured to utilize front-end offloading of storage system processing which may reduce the required processing on the storage controller processing resources. For example, by offloading at least some of the calculations for hash digests and compression, the processing resources of the storage controllers are freed up for use in performing other storage system operations. In addition, because the compression of at least some of the data is performed early in the write flow, bandwidth resources of the storage system may be more efficiently utilized due to the smaller size of the compressed data.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for front-end offloading of storage system processing will now be described in greater detail with reference to FIGS. 7 and 8. Although described in the context of system 100, these platforms may also be used to implement at least portions of other information processing systems in other embodiments.

Figure 7:
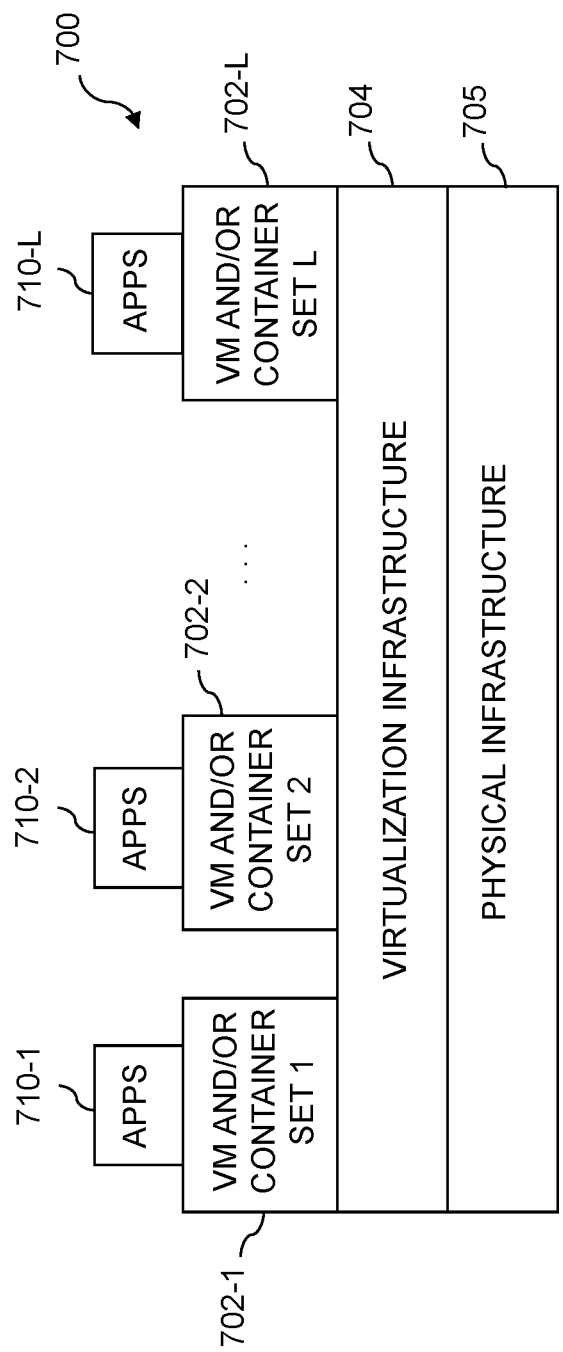
FIGS. 7 and 8 show examples of processing platforms that may be utilized to implement at least a portion of an information processing system in illustrative embodiments.
Figure 8:
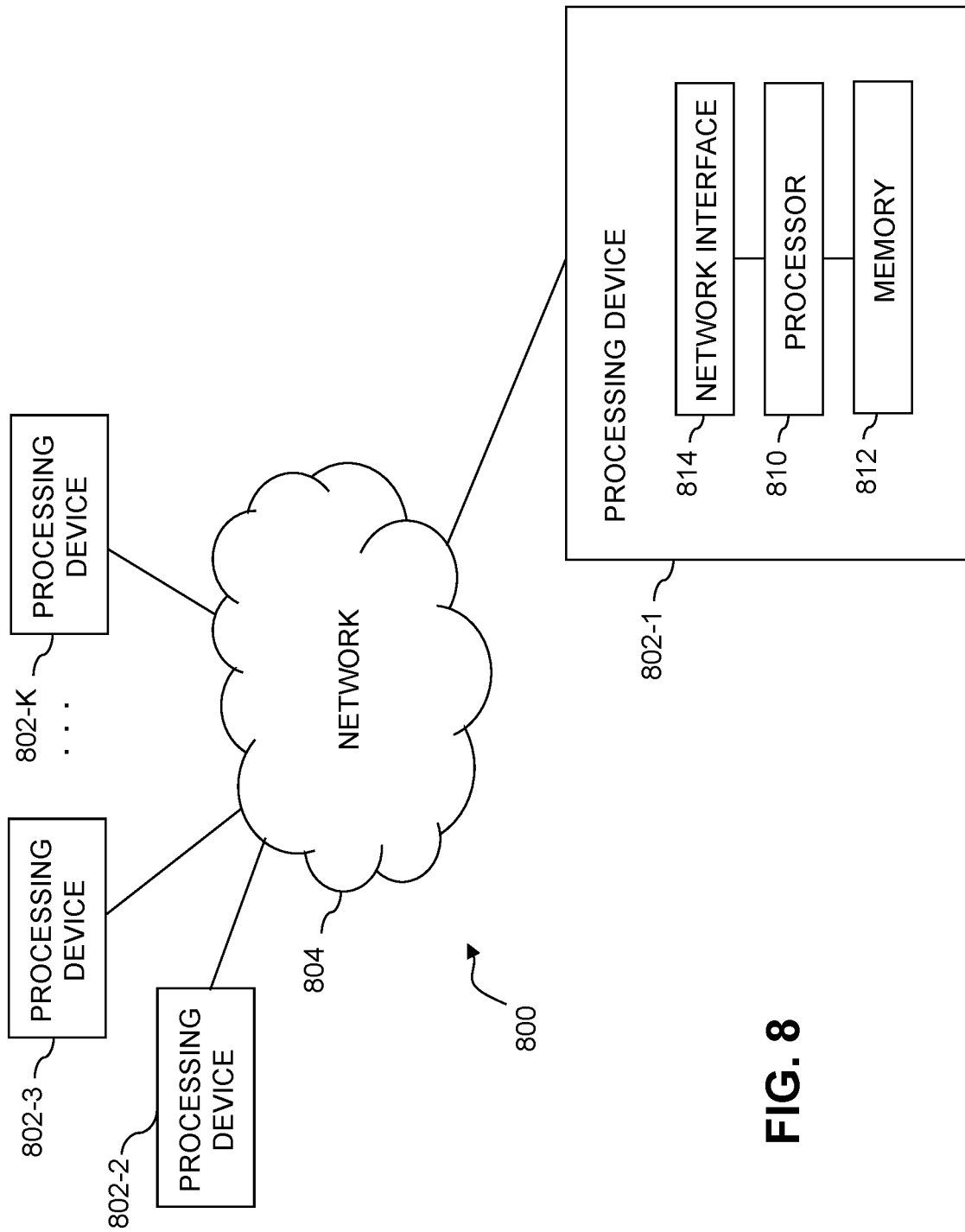

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide storage functionality of the type described above for one or more processes running on a given one of the VMs.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide storage functionality of the type described above for one or more processes running on different ones of the containers. For example, a container host device supporting multiple containers of one or more container sets can implement one or more instances of the processes of FIGS. 4-6 for front-end offloading of storage system processing.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising:
a plurality of storage nodes each comprising a plurality of storage devices;
a first storage node of the plurality of storage nodes comprising a front-end device, the front-end device comprising processing circuitry, the first storage node further comprising at least one first processor and memory that are separate from at least one second processor and memory of the processing circuitry of the front-end device;
the front-end device being configured:
to obtain a write operation, the write operation comprising at least a first block of data;
to calculate a hash digest based at least in part on the first block of data; and
to provide the hash digest to the at least one first processor;
the at least one first processor being configured:
to identify a first data page that comprises a second block of data that is a target for replacement by the first block of data;
to identify a second storage node of the plurality of storage nodes based at least in part on the first data page having a corresponding hash signature that indicates that the first data page is stored in one or more of the storage devices of the second storage node; and
to transmit the hash digest to the second storage node;
the front-end device of the first storage node being further configured:
to compress the first block of data; and
to provide the compressed first block of data to the at least one first processor of the first storage node;
the at least one first processor of the first storage node being further configured to store the compressed first block of data in a write cache of the storage system;
wherein the at least one first processor of the first storage node is further configured:
to obtain a hash signature for a second data page from the second storage node;
to identify a third storage node based at least in part on the hash signature of the second data page; and
to transmit the hash signature of the second data page to the third storage node;
wherein the third storage node is configured:
to obtain each block of the first data page that is not being changed as a result of being overwritten by the write operation from the second storage node;
to separately compress each obtained block of data that is not being changed as a result of being overwritten by the write operation;
to obtain the compressed first block of data from the write cache;
to generate the second data page by combining the compressed blocks of data that are not being changed as a result of being overwritten by the write operation with the compressed first block of data; and
to store the second data page in one or more of the storage devices of the third storage node.

2. The apparatus of claim 1 wherein the second storage node is configured:
to obtain a compressed version of the first data page from the one or more storage devices of the second storage node, wherein the compressed version was previously generated by one of (i) the first storage node and provided by the first storage node to the second storage node, and (ii) the second storage node;
to decompress the compressed version of the first data page;
to calculate a hash digest for each block of the first data page that is not being changed in the second storage node as a result of being overwritten by the write operation;
to calculate the hash signature for the second data page based at least in part on the hash digests calculated for each block; and
to transmit the hash signature for the second data page to the first storage node.

3. The apparatus of claim 1 wherein:
the front-end device of the first storage node is further configured:
to generate compression information that corresponds to the compression of the first block of data, the compression information comprising at least one of an indication that the first block of data is compressed, a type of compression used on the first block of data and a size of the compressed first block of data; and
to provide the compression information to the at least one first processor of the first storage node; and
the at least one first processor of the first storage node being further configured to store the compression information in metadata associated with the storage of the first block of data in the write cache.

4. The apparatus of claim 1 wherein the third storage node is further configured to store compression information corresponding to the second data page in metadata of one or more storage devices of the third storage node, the compression information indicating that the blocks of the second data page are compressed individually and an indication of a compression type and compression size for each of the blocks of the second data page.

5. A method comprising:
obtaining, by a front-end device of a first storage node of a storage system, a write operation, the write operation comprising at least a first block of data, the front-end device comprising processing circuitry;
calculating, by the front-end device of the first storage node, a hash digest based at least in part on the first block of data;
providing, by the front-end device of the first storage node, the hash digest to at least one first processor of the first storage node, the first storage node comprising the at least one first processor and further comprising memory coupled to the at least one first processor, the at least one first processor and the memory being separate from at least one second processor and memory of the processing circuitry of the front-end device;
identifying, by the at least one first processor of the first storage node, a first data page that comprises a second block of data that is a target for replacement by the first block of data; and
identifying, by the at least one first processor of the first storage node, a second storage node based at least in part on the first data page having a corresponding hash signature that indicates that the first data page is stored in one or more storage devices of the second storage node; and
transmitting, by the at least one first processor of the first storage node, the hash digest to the second storage node;
wherein the method further comprises:
compressing, by the front-end device, the first block of data;
providing, by the front-end device, the compressed first block of data to the at least one first processor of the first storage node;
storing, by the at least one first processor of the first storage node, the compressed first block of data in a write cache of the storage system;
obtaining, by the at least one first processor of the first storage node, a hash signature for a second data page from the second storage node;
identifying, by the at least one first processor of the first storage node, a third storage node based at least in part on the hash signature of the second data page;
transmitting, by the at least one first processor of the first storage node, the hash signature of the second data page to the third storage node;
obtaining, by the third storage node, each block of the first data page that is not being changed as a result of being overwritten by the write operation from the second storage node;
separately compressing, by the third storage node, each obtained block of data that is not being changed as a result of being overwritten by the write operation;
obtaining, by the third storage node, the compressed first block of data from the write cache;
generating, by the third storage node, the second data page by combining the compressed blocks of data that are not being changed as a result of being overwritten by the write operation with the compressed first block of data; and
storing, by the third storage node, the second data page in one or more storage devices of the third storage node.

6. The method of claim 5 wherein the second storage node is configured:
to obtain a compressed version of the first data page from the one or more storage devices of the second storage node, wherein the compressed version was previously generated by one of (i) the first storage node and provided by the first storage node to the second storage node, and (ii) the second storage node;
to decompress the compressed version of the first data page;
to calculate a hash digest for each block of the first data page that is not being changed in the second storage node as a result of being overwritten by the write operation;
to calculate the hash signature for the second data page based at least in part on the hash digests calculated for each block; and
to transmit the hash signature for the second data page to the first storage node.

7. The method of claim 5 wherein the method further comprises:
generating, by the front-end device, compression information that corresponds to the compression of the first block of data, the compression information comprising at least one of an indication that the first block of data is compressed, a type of compression used on the first block of data and a size of the compressed first block of data;
providing, by the front-end device, the compression information to the at least one first processor of the first storage node; and
storing, by the at least one first processor of the first storage node, the compression information in metadata associated with the storage of the first block of data in the write cache.

8. The method of claim 5 wherein the third storage node is further configured to store compression information corresponding to the second data page in metadata of one or more storage devices of the third storage node, the compression information indicating that the blocks of the second data page are compressed individually and an indication of a compression type and compression size for each of the blocks of the second data page.

9. A computer program product comprising a non-transitory processor-readable storage medium having stored therein program code of one or more software programs, wherein:
  at least a portion of the program code when executed by a front-end device of a storage system, the front-end device comprising processing circuitry, causes the front-end device:
    to obtain a write operation, the write operation comprising at least a first block of data;
    to calculate a hash digest based at least in part on the first block of data; and
    to provide the hash digest to at least one first processor of a first storage node of the storage system, the first storage node comprising the front-end device, the first storage node comprising the at least one first processor, and further comprising memory coupled to the at least one first processor, the at least one first processor and the memory being separate from at least one second processor and memory of the processing circuitry of the front-end device; and
  at least a portion of the program code when executed by the at least one first processor of the first storage node causes the at least one first processor:
    to identify a first data page that comprises a second block of data that is a target for replacement by the first block of data;
    to identify a second storage node based at least in part on the first data page having a corresponding hash signature that indicates that the first data page is stored in one or more storage devices of the second storage node; and
    to transmit the hash digest to the second storage node;
  at least a portion of the program code when executed by the front-end device further causes the front-end device:
    to compress the first block of data; and
    to provide the compressed first block of data to the at least one first processor of the first storage node;
  at least a portion of the program code when executed by the at least one first processor of the first storage node further causes the at least one first processor to store the compressed first block of data in a write cache of the storage system; and
  at least a portion of the program code when executed by the at least one first processor of the first storage node further causes the at least one first processor:
  to obtain a hash signature for a second data page from the second storage node;
  to identify a third storage node based at least in part on the hash signature of the second data page; and
  to transmit the hash signature of the second data page to the third storage node;
  wherein the third storage node is configured:
  to obtain each block of the first data page that is not being changed as a result of being overwritten by the write operation from the second storage node;
  to separately compress each obtained block of data that is not being changed as a result of being overwritten by the write operation;
  to obtain the compressed first block of data from the write cache;
  to generate the second data page by combining the compressed blocks of data that are not being changed as a result of being overwritten by the write operation with the compressed first block of data; and
  to store the second data page in one or more storage devices of the third storage node.

10. The computer program product of claim 9 wherein the second storage node is configured:
  to obtain a compressed version of the first data page from the one or more storage devices of the second storage node, wherein the compressed version was previously generated by one of (i) the first storage node and provided by the first storage node to the second storage node, and (ii) the second storage node;
  to decompress the compressed version of the first data page;
  to calculate a hash digest for each block of the first data page that is not being changed in the second storage node as a result of being overwritten by the write operation;
  to calculate the hash signature for the second data page based at least in part on the hash digests calculated for each block; and
  to transmit the hash signature for the second data page to the first storage node.

11. The computer program product of claim 9 wherein:
  at least a portion of the program code when executed by the front-end device further causes the front-end device:
    to generate compression information that corresponds to the compression of the first block of data, the compression information comprising at least one of an indication that the first block of data is compressed, a type of compression used on the first block of data and a size of the compressed first block of data; and
    to provide the compression information to the at least one first processor of the first storage node; and
  at least a portion of the program code when executed by the at least one first processor of the first storage node further causes the at least one first processor to store the compression information in metadata associated with the storage of the first block of data in the write cache.

12. The computer program product of claim 9 wherein the third storage node is further configured to store compression information corresponding to the second data page in metadata of one or more storage devices of the third storage node, the compression information indicating that the blocks of the second data page are compressed individually and an indication of a compression type and compression size for each of the blocks of the second data page.

* * * * *